United States Patent [19]

Whang

[11] 4,214,679
[45] Jul. 29, 1980

[54] MEASURED QUANTITY DISPENSER

[76] Inventor: Chi-Man Whang, 134-33 Kochok-dong, Youngdungpo-ku, Seoul, Rep. of Korea

[21] Appl. No.: 903,519

[22] Filed: May 8, 1978

[30] Foreign Application Priority Data

May 31, 1977 [KR] Rep. of Korea .......................... 3518
Jun. 7, 1977 [KR] Rep. of Korea .......................... 3649
Jun. 9, 1977 [KR] Rep. of Korea .......................... 3707

[51] Int. Cl.² ............................................. G01F 11/26
[52] U.S. Cl. ....................................... 222/158; 222/456
[58] Field of Search .................... 222/154, 156-159, 222/205, 437, 454-457, 442, 444; 138/40, 42; 215/6

[56] References Cited

U.S. PATENT DOCUMENTS

| Re. 23,434 | 11/1951 | Numbers | 222/158 X |
|---|---|---|---|
| 845,175 | 2/1907 | Hutchins | 222/456 X |
| 1,556,911 | 10/1925 | Callender | 222/158 X |
| 1,840,190 | 1/1932 | Dyck | 222/158 |
| 2,511,493 | 6/1950 | Cerruti | 222/457 X |
| 3,716,173 | 2/1973 | Yasso | 222/457 X |

Primary Examiner—Robert J. Spar
Assistant Examiner—Fred A. Silverberg
Attorney, Agent, or Firm—Fraser and Bogucki

[57] ABSTRACT

A measured quantity liquid dispenser may be provided as part of or connected to a volumetric container to avoid the requirement of a separate measuring cup and includes a container having an elongated neck with a graduated cup disposed therein and a removable cap. Grooves extending longitudinally between the neck and cup permit the dispenser to be tilted with the cap on to fill the cup to a desired level. With the cap off, the dispenser may be tilted to drain the measured liquid from the cup while an angular relationship between the neck and container prevents additional liquid from flowing into the neck or cup.

10 Claims, 8 Drawing Figures

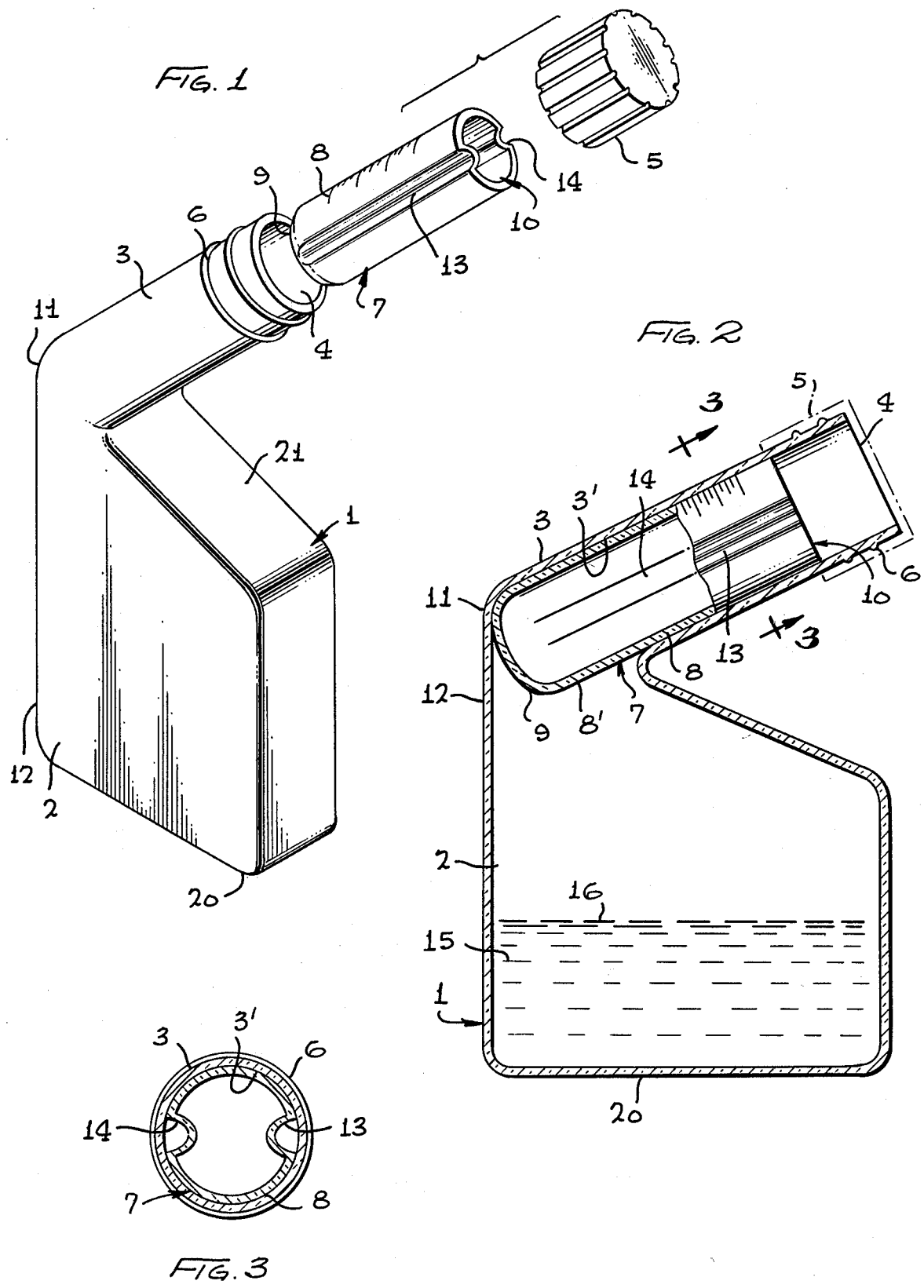

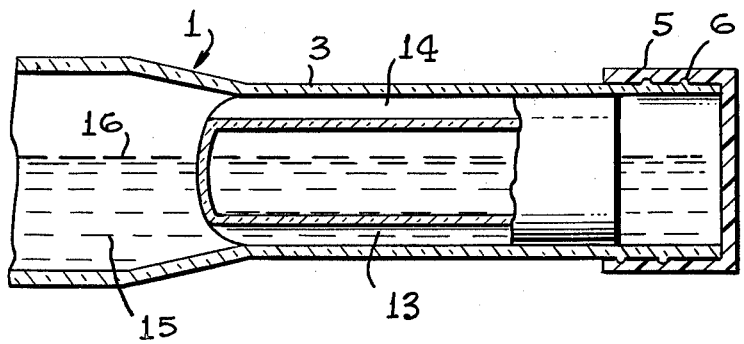
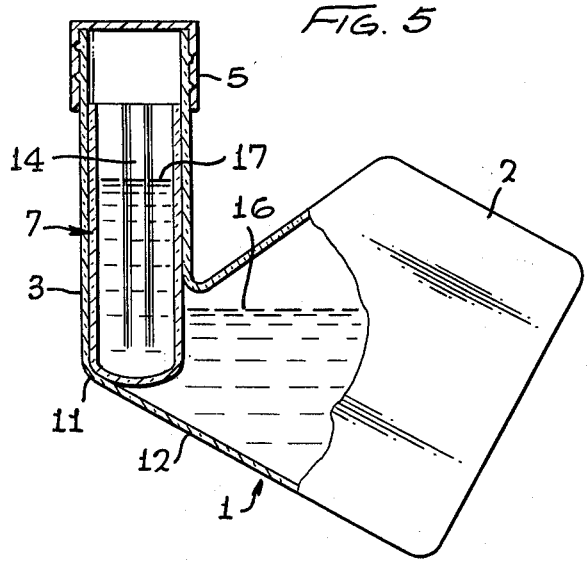
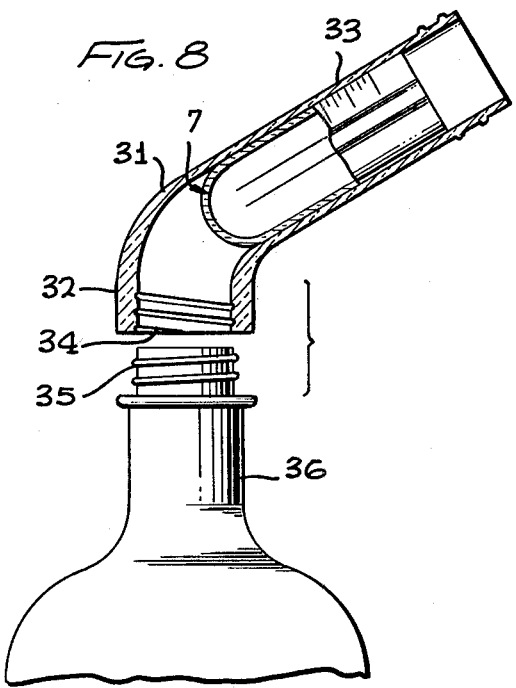
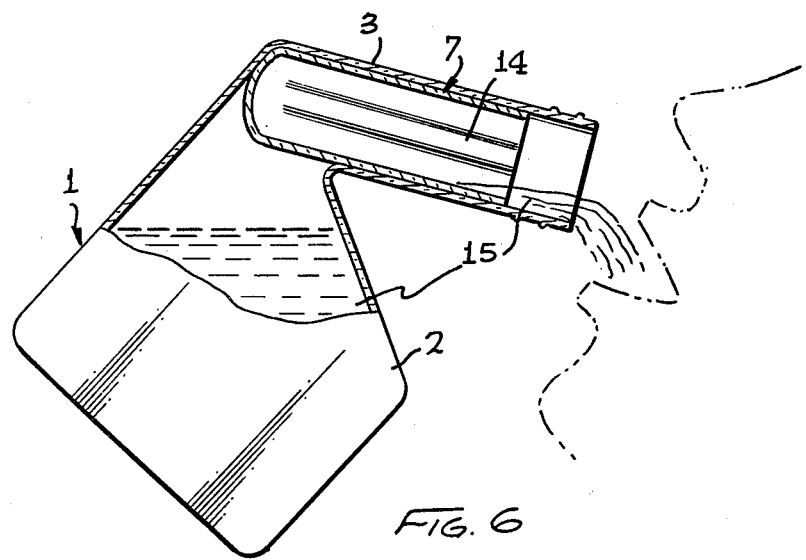
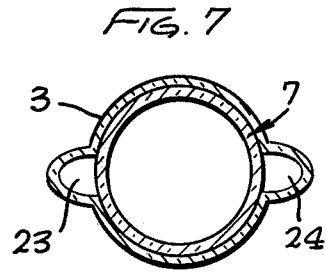

MEASURED QUANTITY DISPENSER

BACKGROUND OF THE INVENTION

1. Field of the Invention

This invention relates to a dispenser such as a medicine dispenser for quickly and easily providing a measured quantity of a liquid.

2. Description of the Prior Art

Liquids such as medicines must frequently be dispensed in small, measured quantities from a larger quantity within a container. A measuring device such as a graduated cup or spoon must be used to measure the desired quantity, must be washed after each use and must be stored until the next use. These requirements are in inconvenience at best and become especially troublesome when traveling.

SUMMARY OF THE INVENTION

An economical and convenient measured quantity dispenser in accordance with the invention includes a graduated cup having a closed end and an opposite, open end, an elongated, generally cylindrical neck extending between a first end adapted for communication with a body portion of a container and an opposite open mouth, the neck removably receiving and retaining the cup therein with the closed end of the cup adjacent the first end of the neck and the open end of the cup adjacent the mouth. At least two grooves, and preferably a pair of opposed grooves, extend longitudinally between the neck and cup to provide communication between a body portion of a container connected to the neck and the open end of the cup for the flow of liquid. A removable cap seals the open mouth as the container is tilted to allow a desired amount of liquid to flow from the body of the container through the grooves to the cup.

An angular relationship between the neck and the container serves both to retain the cup within the neck and to permit liquid to be poured from the cup without releasing liquid from the container. Nonconcentric connection of the neck to the container at a sidewall thereof further facilitates pouring liquid from the cup without additional liquid from the body portion of the container entering the neck. Because the cup remains within the neck of the dispenser, there is no need to wash the cup after each use and no problem of the cup becoming separated from the container.

BRIEF DESCRIPTION OF THE DRAWINGS

A better understanding of the invention may be had from a consideration of the following Detailed Description taken in conjunction with the accompanying drawings in which:

FIG. 1 is an exploded perspective view of a measured quantity liquid dispenser in accordance with the invention;

FIG. 2 is a sectional side view of the dispenser shown in FIG. 1;

FIG. 3 is a sectional view taken along line 3—3 in FIG. 2;

FIG. 4 is a sectional side view of the dispenser shown in FIG. 1 with the dispenser tilted to fill the cup;

FIG. 5 is a sectional side view of the dispenser shown in FIG. 1 after filling of the cup;

FIG. 6 is a sectional side view of the dispenser shown in FIG. 1 as liquid is poured from the cup;

FIG. 7 is a sectional view of an alternative embodiment of the dispenser taken along line 3—3 in FIG. 2; and FIG. 8 is a sectional side view of an alternative embodiment of a dispenser in accordance with the invention.

DETAILED DESCRIPTION OF THE INVENTION

Referring now to FIGS. 1-6, a measured quantity dispenser such as the liquid medicine container 1 includes a body portion 2 which is connected to a generally cylindrical, elongated neck portion 3 having a mouth 4, the neck 3 being bent and inclined to the body 2 of the container 1. A cap 5 is removably connected by threads 6 to close the mouth 4 of neck 3. A cup 7 has graduation marks 8 spaced therealong between a closed bottom end 9 and an opposite open mouth end 10. The cup 7 has a generally cylindrical shape conforming closely to the inside of the neck 3 with a depth between the bottom end 9 and open end 10 greater than the diameter at the open end 10.

One purpose of this invention is to provide the container 1 with the cup 7 inside of it in a structure which is simple and which can easily be produced, eliminating the conventional defects of a separate cup and container. The container 1 is produced so that the container neck 3 is inclined to the container body at an angle of about 65° to the vertical in order to accomplish the said purpose. The cup 7 is inserted into the neck 3 of the container 1 and is retained therein by a bend 11 which is formed as the neck joins the container 1 nonconcentrically at a side wall 12 at a location spaced from the center of the container. The cup has at least two slots 13, 14 in total on the side of the cup itself. The slots 13, 14 are disposed in opposed relationship on opposite sides of the cup 7. The slots may be made on the inside of the container neck instead of being made on the cup itself.

The container 1 is made with at least the neck portion 3 and the cup 7 made of transparent plastic or glass. The cup 7 with the graduation marks 8 can be tightly inserted into the container neck 3 with a close fitting, mating relationship between the cup 7 and the neck 3. The cup 7 is inserted so that the bottom 9 of the cup 7 touches the inside top of the container body 2 at curve 11. The mouth 10 of the cup is positioned adjacent to the mouth 4 of the container neck 3. It is desirable to produce the cup 7 from transparent plastic or glass.

The slots 13, 14 are made on the side of the cup 7 and extend between cup 7 and neck 3 to provide communication for the flow of liquid between the container body 2 and the mouth 10 of cup 7. The main purpose of these slots 13, 14 is to let the liquid medicine flow into the cup 7, but the slots 13, 14 also may serve to fix the cup tight in the container neck 3.

Directions for use of the container with the cup inside are as follows:

First, pour the liquid medicine into the container body 2 up to the top of the container body. Then insert the cup 7 into the container neck 3 and close the mouth 4 of the cup with the cap 5. When taking the medicine, lay the container 1 horizontally with the cap 5 closed (see FIG. 4). When the container is laid horizontally, the air in the cup 7 flows out to the container body 2 through the upper slot 14 and the liquid medicine in the container body 2 flows into the cup 7 through the lower slot 13. Accordingly, liquid medicine 15 enters the cup 7 until a proper amount of liquid medicine is contained therein. The liquid medicine 15 is indicated in FIG. 4 with a surface level 16. The flow-in amount of liquid medicine into the cup 7 is determined by inclination degree of the container 1 and it can be confirmed by the graduation marks 8 (FIG. 1).

Then put the container up so that the container neck 3 stands vertically (see FIG. 5). At this moment, the liquid medicine 15 in the cup 7 retains a level 17 as shown in FIG. 5 at it separates from the liquid 15 in container body 2, having a level 16. Then take (drink) the liquid medicine 15 in the cup 7 as shown in FIG. 6 after removing the cap 5 from the mouth 4 of the container 3.

After taking the liquid medicine 15, put the container 1 up and close the mouth 4 with the cap 5. Then there is no need to wash the cup clear nor pay special attention to custody of the cup.

This invention is very convenient for taking liquid medicine, especially while traveling. Even if the liquid medicine 15 remains after taking a number of doses, the liquid 15 neither evaporates nor gets dirty as the mouth 4 of the container is closed with the cap 5.

In addition to side wall 12, the body portion 2 of container 1 has a bottom 20 which supports the container 1 at rest in a vertical position and a top surface 21 which joins the side wall 12 to the neck 3.

An alternative arrangement is shown in FIG. 7 in which outwardly extending slots 23, 24 are formed in the neck 3 on opposite sides of cup 7 in place of the inwardly extending slots 13, 14 in cup 7. A minimum of two slots 13, 14 or 23, 24 is required for proper flow of liquid medicine 15 from the container 1 into the cup 7. Liquid flows into the cup 7 through one slot and air flows out through the other.

As shown in an alternative arrangement in FIG. 8, the dispenser may be made as a neck 31 with a connector portion 32 which is bent at an angle to an elongated cup receiving portion 33. Internal threads 34 on connector portion 32 engage external threads 35 on a conventional bottle or other container 36 to permit the neck 31 to be removably connected to container 36.

While there have been shown and described above particular arrangements of a measured quantity liquid dispenser in accordance with the invention for the purpose of enabling a person of ordinary skill in the art to make and use the invention, it should be appreciated that the invention is not limited thereto. Accordingly any modifications, variations or equivalent arrangements within the scope of the accompanying claims should be considered to be within the scope of the invention.

What is claimed is:

1. A measured volume liquid dispenser comprising:
    a container having a body portion with a bottom for supporting the container on a surface in a vertical position and an elongated neck disposed opposite the bottom and extending at an acute angle relative to the vertical direction from the body portion to a container mouth, the container being adapted to receive and retain a cup within the neck;
    the cup being removably disposed within the neck with a close fitting, mating relationship between the cup and the neck, with a closed end of the cup adjacent the container body portion and with an open end of the cup adjacent the container mouth, the neck and cup being shaped to provide a pair of grooves defined between the cup and the neck and extending along the neck between the open and closed ends of the cup in opposed relationship to provide communication therebetween from the body portion to the open end of the cup; and
    a removable cap adapted to engage the neck of the container and sealingly close the mouth thereof.

2. The dispenser according to claim 1 above, wherein at least the neck portion of the container and the cup are transparent.

3. The dispenser according to claim 2 above, wherein the cup has defined thereon graduation markings for indicating an amount of liquid within the cup.

4. The dispenser according to claim 1 above, wherein the container neck and body portions form a single, unitary structure.

5. The dispenser according to claim 1 above, wherein the neck of the container is removably connected to the body portion of the container.

6. A measure quantity liquid dispenser comprising:
    a generally cylindrical cup having a closed end and an opposite open end with the depth therebetween being greater than the diameter of the cup at the open end;
    an elongated generally cylindrical neck extending between a first end adapted for removable connection to and communication with a body portion of a container of liquid to be dispensed and an opposite open mouth at a second end, the neck removably receiving and retaining the cup completely therein in a close fitting mating relationship with the closed end of the cup adjacent the first end of the neck and the open end of the cup adjacent the mouth, the cup and the neck being adapted to provide a path therebetween for the flow of liquid from the first end of the neck to the open end of the cup along the length of the cup, the neck including a bend for connection to the container with the container having a vertical direction, the neck extending at an acute angle relative to the vertical direction, the cup being shaped such that it cannot negotiate the bend and thereby being restrained from moving out of the neck through the first end of the neck; and
    a cap adapted to removably engage the neck to close the open mouth and form a liquid tight seal between the cap and the neck.

7. The dispenser according to claim 6 above, wherein the container body portion includes a bottom, a top extending in opposed relationship to the bottom and a side wall structure connecting the top and bottom to form a container, the neck nonconcentrically adjoining the top adjacent a side wall.

8. The dispenser according to claim 6 above, wherein a pair of opposed, inwardly extending grooves are formed in an outer surface of the cup to provide the path from the first end of the neck to the open end of the cup.

9. The dispenser according to claim 6 above, wherein a pair of opposed, outwardly extending grooves are formed in an inner surface of the neck to provide the liquid path from the first end of the neck to the open end of the cup.

10. The dispenser according to claim 6 above, wherein the acute angle is about 65 degrees relative to the vertical direction.

* * * * *